Jan. 7, 1930.　　　　O. A. PARKER　　　　1,742,723
HUB AND SPOKE CONNECTION FOR WHEEL BODIES
Filed May 17, 1923　　　3 Sheets-Sheet 1
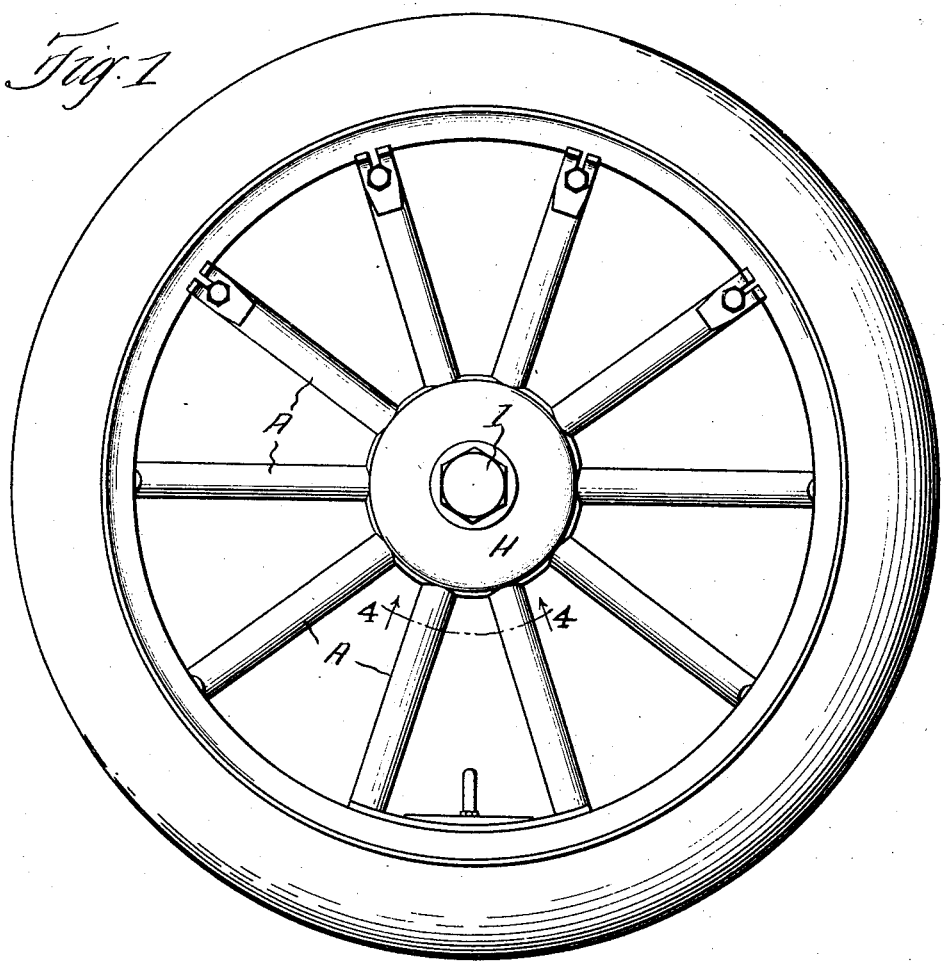
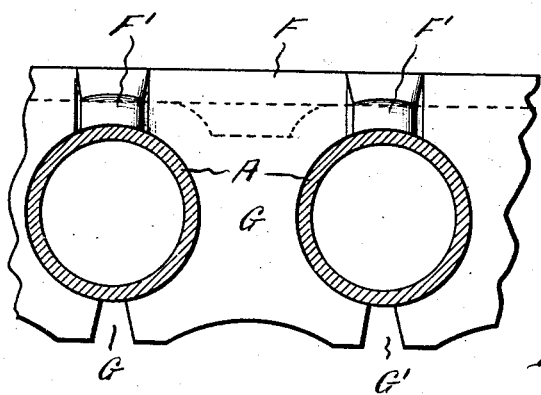

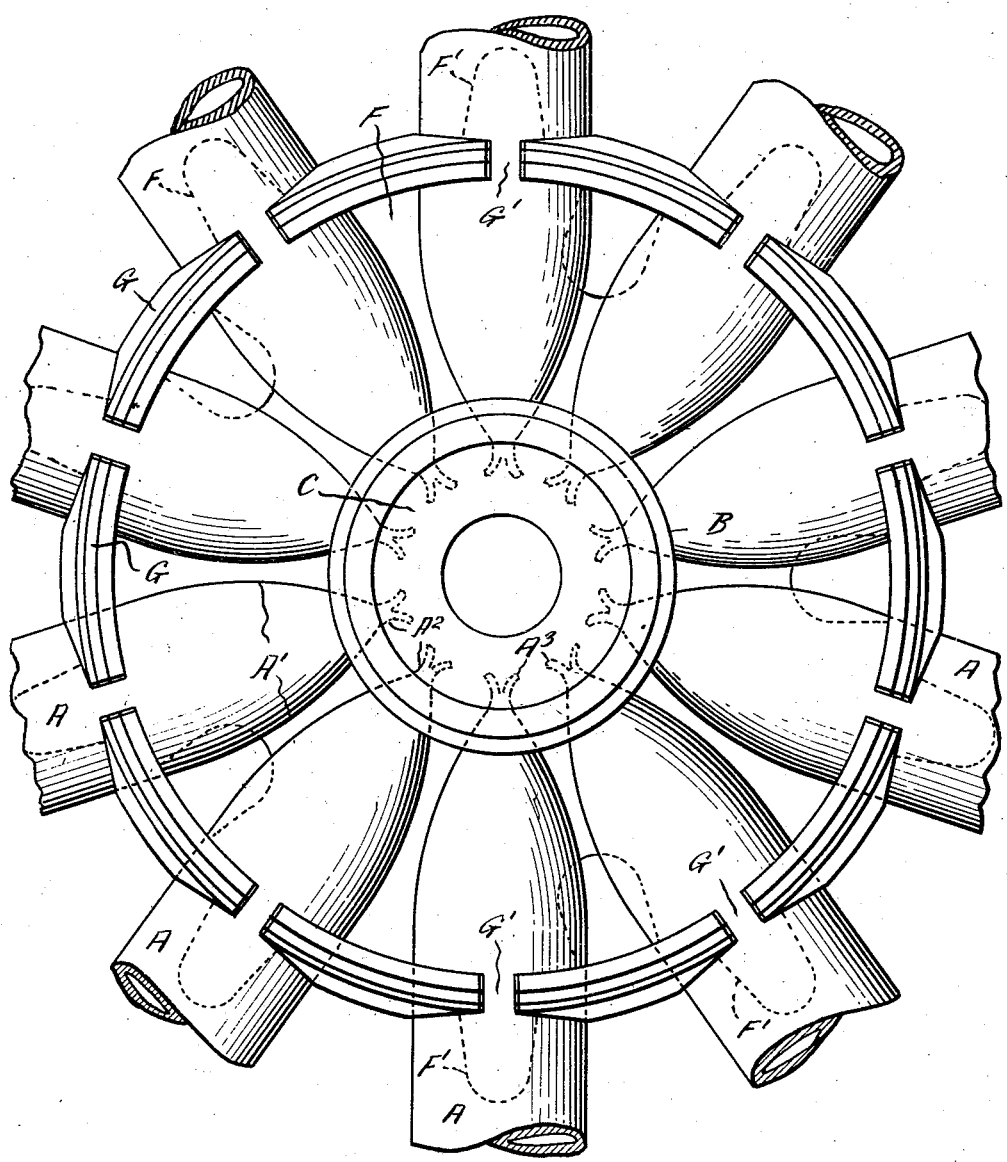

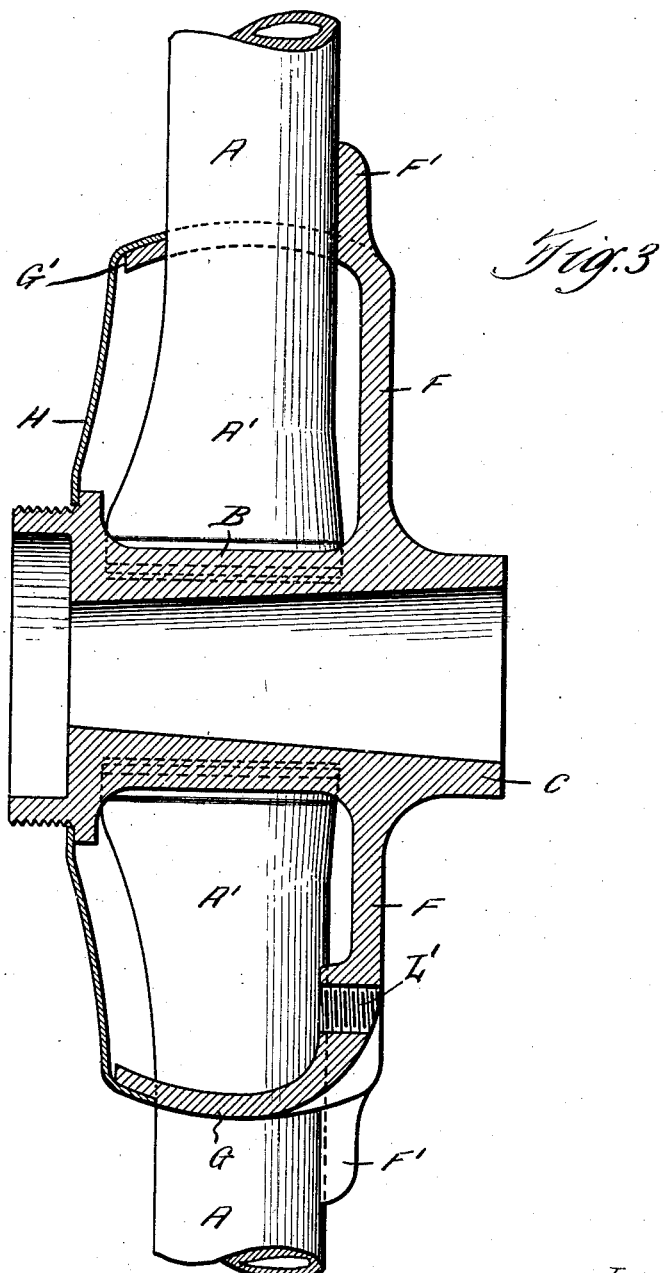

Patented Jan. 7, 1930

1,742,723

UNITED STATES PATENT OFFICE

ORREL A. PARKER, OF CLEVELAND, OHIO, ASSIGNOR TO THE PARKER WHEEL COMPANY, OF CLEVELAND, OHIO, A CORPORATION OF OHIO

HUB AND SPOKE CONNECTION FOR WHEEL BODIES

Application filed May 17, 1923. Serial No. 639,497.

This invention relates generally to metal wheels and the method of making the same and more particularly to a metallic wheel body composed of light tubular metallic spokes of large diameter with relatively thin walls together with a hub formed of metal which, while molten, is cast around the inner ends of the spokes.

A wheel body constructed in this manner is capable of use in connection with a fixed rim or felly to receive a demountable tire carrying rim, or the spoke ends can be provided with fastening devices and the tire carrying rim applied directly to the ends of the spokes, thereby eliminating the weight of the fixed rim or felly, and also the expense thereof.

One object of the invention is to provide an exceedingly light metallic wheel thereby reducing the unsprung weight to a minimum so far as the wheel is concerned. Another object is to provide a light metallic wheel which will be stronger than other wheels having the same total weight and the same general dimensions, and another object is to produce such wheels at a greatly reduced cost and provide a method for permanently and rigidly securing together all the several parts which require assembling at the center, and at one operation.

Another object of the invention is to provide a wheel structure in which a variety of light weight metals can be employed, such as thin sheet steel, alloy steel, duralumin and aluminum.

With these various objects in view the invention consists in casting the thin barrel portion of the hub about the extreme inner ends of the tubular sheet metal spokes and also casting with the barrel a thin integral flange which contacts with the spokes adjacent their inner ends, which flange may partially or fully reach around each spoke at a point removed from the barrel, thereby securely positioning and uniting the ends of the sheet metal spokes to a cast metal wheel center or hub.

The invention also contemplates certain details of construction and likewise certain modifications, all of which will be fully described hereinafter and set forth in the appended claims.

Heretofore numerous plans have been proposed for making metallic wheels having a hub barrel together with a radially expanded plate and an axially positioned ring flange at the periphery of the plate and securing the spokes to these parts.

In following one plan, after the hub elements have been formed separately from the spokes the latter have been put into final position by inserting each with an endwise movement through an aperture in the flange ring, and then subjecting the spokes to an inwardly directed pressure to secure a fitting of the innermost ends in cavities in the surface parts of the hub barrel and the fitting of the round parts of the spokes in the apertures in the ring flange.

In following another of the earlier plans, a large mass of molten metal has been cast around the inner ends of the spokes to form a heavy solid radially expanded hub, the spokes having at no place outside of the hub barrel any supplemental support for their inner ends, the expectation being to have the heavy expanded hub provide sufficient holding and support for the spokes. It has been found impossible, however, to apply molten metal in this manner to a long section of the thin walled spoke tube without burning away or melting the tube itself. The present invention contemplates utilizing tubular spokes with thin walls and of large diameters, and securing them throughout the entire series at their extreme inner ends by a small light mass of metal brought while molten into contact with the small areas of the spoke ends and simultaneously by a thin integral sheet of molten metal provide a light, strong holding and bracing device situated at points remote from the hub barrel, which contacts with only a narrow portion of each tube and which has all its parts so designed that the metal on cooling contracts in such a way as to not only avoid fracture in any direction, or at any place, but also actually results in a firmer gripping of the spokes.

In the drawings forming a part of this specification, Fig. 1 is a front view of a wheel body constructed in accordance with my invention; Fig. 2 is a front view of the central portion of the wheel body with the hub cap removed; Fig. 3 is a vertical sectional view of the central portion of the wheel body; Fig. 4 is a sectional view on the line 4—4 of Fig. 1 with the hub cap removed.

The wheel presented in the drawings and selected for illustration comprises the large diametered spokes A each having a relatively thin wall and the central holding structure or hub B having the barrel portion C formed with the radially arranged outwardly extending plate or spider F with the ring like flange G concentric with the axle, both the plate and the flange ring being integral with the barrel.

Each spoke A is at its inner end subjected to a compressing action which bends inward two opposite portions $A'$ $A'$ of the wall. The extreme terminal parts of the inner edges of these walls $A'$ become straight and flat as shown at $A^2$, these lying approximately in the plane of the axis of the tube. Flat parts $A^2$ are tightly pressed together for a considerable distance longitudinally of the spoke and furnish a tight closure for the end of the tube to prevent the entrance of molten metal or other material. In practice I prefer to form the extreme edges of the flat portions $A^2$ with diverging lips $A^3$. The flat parts $A^2$ serve several purposes to be described. When the central part of the wheel body is to be completed spokes A are respectively placed in radial positions relative to that line which will afterwards serve as the wheel axis.

The inner edge parts at $A^2$ and $A^3$ of each spoke just described can be fitted in slots in the peripheral part of the central element of a suitable pattern or core box and at more remote points radially other elements of the pattern engage the round parts of the spoke. The core box produces a green sand core which in connection with the cope and drag and the dry sand central core form the mold in which the finished casting is made about the spokes. This casting has the peculiar parts described for receiving and holding the spokes in proper relation to each other, and to the hub, and in such way as not to have them subjected to contact with molten metal over extended areas of their thin walls. The metal barrel part C is relatively thin but there is sufficient to firmly embed or become incorporated with the innermost extremity of each spoke. When these extremities are shaped as at $A^3$ they will interlock with a very thin layer of the metal near the outermost surface of the barrel but with sufficient firmness to hold the spokes rigidly against displacement radially or in any other direction, and the plate-like parts $A^2$ not only serve as a closure against the inflow of metal but also provide a double thickness of metal at this point to guard against complete melting. It is desirable to attain as complete a union as possible of the body of cold metal with the thin layer of molten metal without melting through the wall of the spoke tube, and there can be more or less softening or incipient melting of the extreme edge portion of the plate-like part $A^2$ and of the diverging lips $A^3$ without injury to the structure providing the tube walls at points remote from the barrel (where transverse strains and stresses are experienced) are not subjected to the high heat and the extreme end $A^3$ might be melted and incorporated in the barrel portion of the hub and at the same time make the intimate union that is required. When the several elements of the wheel are limited in the way that I have designed, the molten metal can be easily conducted to the points where it contacts with the several parts of each spoke to accomplish these results and in the casting operation the metal flows to the portions $A^2$ and $A^3$ of the spokes and also is guided to the points where it is allowed to contact with the spoke tubes at points remote from the hub barrel but only over areas which are very narrow longitudinally of the spokes. At this time the heat is being conducted away in two directions and the tube having air therein also conducts some of the heat away and prevents melting or injury. The design of the hub barrel and the arrangement of the adjacent parts of the spokes can be such that heat in the neighborhood of the barrel may be relatively high and even produce a softening or incipient or complete melting of the extreme end parts of the spoke and still a superior welded joint can be attained. At the same time, as above noted, all the tubular metal radially of the extreme end parts $A^2$ is so disposed in relation to the molten metal that injury from high heat is avoided as previously described.

The radially expanded plate or spider F extends far enough out radially to provide a firm holding and bracing for the spokes at points remote from the barrel and as stated, the ring like flange G integral with this plate extends in axial directions across the transverse planes in which the spokes lie. This plate is not a mere disk, but is shaped with a peculiar formation, it having at its periphery extensions $F'$ and in practice I prefer to break up the continuity of the ring-like flange G by providing breaks or gaps $G'$ at points substantially opposite the extensions $F'$. As shown in Figs. 2 and 3 the plate or radial flange is shown formed at the inner end of the barrel and the ring or axial portion of the flange extends forwardly.

By shaping and arranging the plate and ring-like flanges as herein shown and described all breakage or fracture of the casting is obviated. When the metal shrinks in cooling, the conformation is such that provision is made for its contracting without breakage.

And such shrinking or contraction as occurs tends to draw the ring of metal around each spoke more tightly towards its axis and the shrinkage throughout the whole mass tends to draw the outermost joints of the metal inward toward the barrel, and in so far as there is gripping contact with the spokes, the latter are still further firmly gripped and held in predetermined positions.

The light short diametered hub has contact only for a fraction of an inch with the tube metal at its extreme inner end and the ring or flange G being, as described, thin, measured radially, and being spaced at a distance from the barrel, a considerable part of each spoke is left out of contact with adjacent bodies, there being a relatively large chamber between the barrel of the hub and the ring or flange. In the construction shown in Figs. 1 and 3 this is closed by the annular plate H placed upon the forward end of the hub and held in place by the hub cap I.

The brake drum can be attached to the wheel body by bolts extending through the hub flange F, as is the usual practice, or it can be attached by bolts (not shown) entering the threaded opening L' in the flange.

In many wheels of this class the elements of the structure, at the outer ends of the spokes, are depended on to prevent the spokes from displacement in radial direction from the hub. In the present structure the spokes are held directly to the surface part of the barrel rigidly radially and independently of the felly. It will also be understood that the tire carrying rim can be applied directly to the ends of the spokes which are provided with suitable fastening devices and in Fig. 1 I have so shown the tire carrying rim applied and secured.

By flattening, smashing or swaging the end of the spoke at the inner end it will be greatly strengthened so far as withstanding lateral strains are concerned, and the flange and annulus constituting parts of the center of the wheel body can be so dimensioned and positioned as to provide the additional lateral and circumferential support at the proper place upon the spoke. In flattening the end of the spoke it can be given the desired shape for cooperating with any particular shape or contour of flange and annulus.

By constructing a wheel according to the various methods herein set forth, it will be seen that I provide an exceedingly simple and durable wheel comprising as it does a cast metal hub comparatively thin and relatively thin tubular sheet metal spokes of comparatively large diameter, the extreme inner ends of which are closed and securely anchored in the cast metal hub barrel and the inner portions thereof having the second or additional contacting union with an integrally connected hub member, which two contacts and unions, one at the extreme end of the spoke, and one spaced from said end, provide all the connections necessary between the spokes and the hubs.

The barrel of the hub has its interior shaped as usual to receive the axle spindle and anti-friction bearings.

Having thus described my invention, what I claim is:

1. In a wheel a central hub barrel and a series of tubular spokes each spoke having its inner end shaped to provide a tapered portion narrowing toward the plane of the longitudinal axis of the spoke and to provide a flattened element at said axis, the tapered portions of the spokes being outside of the barrel, the barrel being cast about and positively fastening said flattened elements to the surface part of the barrel and holding them against radial displacement independently of the felly, and integral supplemental holding means spaced at a distance from the barrel radially of the spokes.

2. In a wheel, a plurality of tubular metal spokes each spoke having the metal at opposite sides of its inner end shaped to converge together and to provide an elongated holder at the extreme inner end formed with two flat plates forced together to form a closure for the spoke and a hub-like element having a relatively thin walled barrel formed of metal cast to have its surface part embedded around the flat end element on each spoke and supplemental holding means spaced radially from the barrel and integral therewith and engaging with relatively narrow areas of the outer surfaces of the spokes.

3. In a wheel, a central hub part having a radially extended plate-like element and a ring or flange spaced from the barrel and integral therewith and a series of tubular spokes each spoke having the metal at its inner end shaped to provide a tapered portion with sides converging toward the axis of the spoke and to extend from one side of said axis, the said plate-like element being cast to have the surface part of the metal barrel embed the inner end edges of the spokes.

In testimony whereof, I hereunto affix my signature.

ORREL A. PARKER.